(12) United States Patent
Carr et al.

(10) Patent No.: US 11,845,622 B2
(45) Date of Patent: Dec. 19, 2023

(54) TRUCK MEASUREMENT OF A MILLING MACHINE

(71) Applicant: Caterpillar Paving Products Inc., Brooklyn Park, MN (US)

(72) Inventors: Robert Edwin Carr, Sebastian, FL (US); Eric S. Engelmann, Delano, MN (US); Keng Yew Anthony Low, Singapore (SG); Jacob Simmer, Chaska, MN (US); Conwell K. Rife, Jr., Wayzata, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 238 days.

(21) Appl. No.: 17/119,481

(22) Filed: Dec. 11, 2020

(65) Prior Publication Data
US 2022/0186446 A1    Jun. 16, 2022

(51) Int. Cl.
*B65G 67/22*    (2006.01)
*E01C 23/088*   (2006.01)

(52) U.S. Cl.
CPC ............ *B65G 67/22* (2013.01); *E01C 23/088* (2013.01); *G05D 2201/0202* (2013.01)

(58) Field of Classification Search
CPC ...... E01C 23/088; E01C 23/127; B65G 67/22
See application file for complete search history.

(56) References Cited

U.S. PATENT DOCUMENTS

| | | | |
|---|---|---|---|
| 8,749,628 B2 | 6/2014 | Wuestefeld et al. | |
| 9,562,334 B2 | 2/2017 | Von Der Lippe et al. | |
| 9,957,675 B2 | 5/2018 | Marsolek et al. | |
| 10,308,440 B2 | 6/2019 | Marsolek et al. | |
| 11,274,921 B1* | 3/2022 | Walz | G01B 11/24 |
| 2013/0080000 A1* | 3/2013 | Von der Lippe | E01C 23/088 701/50 |
| 2016/0177521 A1* | 6/2016 | Laugwitz | E01C 23/088 299/1.5 |
| 2016/0187182 A1* | 6/2016 | Beltramin | G01G 19/04 177/177 |
| 2016/0208447 A1* | 7/2016 | Berning | E01C 23/088 |
| 2017/0205814 A1* | 7/2017 | Marsolek | G06F 3/04847 |
| 2018/0179732 A1 | 6/2018 | Bartsch | |
| 2020/0219400 A1 | 7/2020 | Mcalpine et al. | |
| 2020/0238881 A1 | 7/2020 | Hendricks | |
| 2020/0239244 A1 | 7/2020 | Hendricks | |
| 2020/0240112 A1 | 7/2020 | Hendricks | |
| 2020/0241561 A1 | 7/2020 | Hendricks | |
| 2020/0256021 A1 | 8/2020 | Mcalpine et al. | |

FOREIGN PATENT DOCUMENTS

CN    110517005    11/2019

* cited by examiner

*Primary Examiner* — Janine M Kreck
(74) *Attorney, Agent, or Firm* — Schwegman Lundberg & Woessner, P.A.

(57) ABSTRACT

A milling machine may include a frame supported by a traction device, a milling drum for milling a surface and supported on the frame, and a conveyor for receiving milled material from the milling drum and conveying the milled material upward to a release point. The milling machine may include a sensor configured for monitoring loading of a truck by the milling machine and a controller in communication with the sensor to coordinate with the sensor and recognize when the truck is full.

12 Claims, 6 Drawing Sheets ern to the asphalt plant with the milled material. In many
TRUCK MEASUREMENT OF A MILLING MACHINE

TECHNICAL FIELD

The present disclosure relates generally to milling machine data collection and use. Still more particularly, the present disclosure relates to an accounting and loading system for a milling machine. More particularly, the present disclosure relates to a truck accounting system and a truck sensing and loading system for a milling machine.

BACKGROUND

Roadways are built to facilitate vehicular travel. Depending upon usage density, base conditions, temperature variation, moisture levels, and/or physical age, the surfaces of the roadways may eventually become misshapen, cracks may form allowing ingress of water causing freeze thaw damage, and other wear may occur. The roadway may become unable to support wheel loads or may otherwise be unsuitable for vehicular traffic. In order to rehabilitate the roadways for continued vehicular use, spent roadway material may be removed in preparation for resurfacing.

Milling machines such as cold planers, scarifiers, reclaimers, and the like may be used to break up and remove layers of an asphalt roadway. A reclaimer may tear up the roadway surface mix it with or without additives, and lay it back down as a base course for additional paving. In contrast, a cold planer or scarifier may cut and remove the roadway surface. For example, a cold planer typically includes a frame propelled by tracked or wheeled drive units. The frame supports an engine, an operator's station, a milling drum, and conveyors. The milling drum, fitted with cutting tools, is rotated through a suitable interface with the engine to mill the surface of the roadway. The milled roadway material is deposited by the milling drum onto the conveyors, which transfer the milled material into haul trucks for removal from the worksite. As haul trucks are filled, they are replaced with empty haul trucks. The filled trucks transport the milled material to a different location, such as an asphalt plant, to be reused as aggregate in new asphalt or otherwise recycled. This transport process repeats until the milling process is finished.

For various purposes, such as billing, job estimates, and ongoing paving operations, it may be useful to the mill operator to know the number and size of trucks that are being filled by the milling machine. Current systems may rely on counting that occurs at the asphalt plant as the trucks return to the asphalt plant with the milled material. In many cases, the asphalt plant may be operated by a different company or contractor involved in a resurfacing project.

In addition to the number of trucks, information about the truck capacity and fill volumes may be useful for purposes of efficiently utilizing truck resources without overloading the trucks. In many cases, current filling operations rely on visual inspection, estimates of fill levels, or other user judgment to determine when and/or if a truck is full. These judgments can be inaccurate and can be problematic. For example, if a truck is overfilled, the trucking company can be subject to fines due to axle loads that exceed roadway restrictions. Moreover, if trucks are underfilled, the cost of the project may increase due to the trucking inefficiencies.

Chinese patent application number 201910940523 relates to a truck loading counting method and system. The application discusses a obtaining loading information of a loading positioning device installed on a vehicle; judging whether the vehicle is fully loaded or not according to the loading information, and if yes, starting the task, and obtaining geographical position information of the loading positioning device.

SUMMARY

In one or more embodiments, a milling machine may include a frame supported by a traction device, a milling drum for milling a surface and supported on the frame, and a conveyor for receiving milled material from the milling drum and conveying the milled material upward to a release point. The milling machine may also include a truck sensor configured for recognizing a truck and a controller in communication with the truck sensor to coordinate with the truck sensor and maintain and store a truck count.

In one or more embodiments, a method of accounting may include, using a controller on a milling machine in coordination with a truck sensor, monitoring an area around a milling machine for a truck. The method may also include performing an accounting of the truck to generate a truck count and storing the truck count.

In one or more embodiments, a milling machine may include a frame supported by a traction device, a milling drum for milling a surface and supported on the frame, and a conveyor for receiving milled material from the milling drum and conveying the milled material upward to a release point. The milling machine may also include a loading sensor configured for monitoring loading of a truck by the milling machine and a controller in communication with the loading sensor to coordinate with the loading sensor and recognize when the truck is full.

In one or more embodiments, a method of load monitoring may include obtaining a volume, milling a surface to generate milled material, and conveying the milled material into a truck box. The method may also include scanning the truck box to obtain a material volume and comparing the material volume to the volume.

In one or more embodiments, a method of load monitoring may include monitoring readings from axle scales on a truck, milling a surface to generate milled material, and conveying the milled material into a truck box. The method may also include stopping the milling and conveying when the readings reach a selected axle load.

In one or more embodiments, a milling machine may include a frame supported by a traction device, a milling drum for milling a surface and supported on the frame, and a conveyor for receiving milled material from the milling drum and conveying the milled material upward to a release point. The milling machine may also include a sensor configured for scanning a truck box and a controller in communication with the sensor to coordinate with the sensor. The controller may be further configured to store a truck count and recognize when the truck box is full.

DETAILED DESCRIPTION

Figure 1:
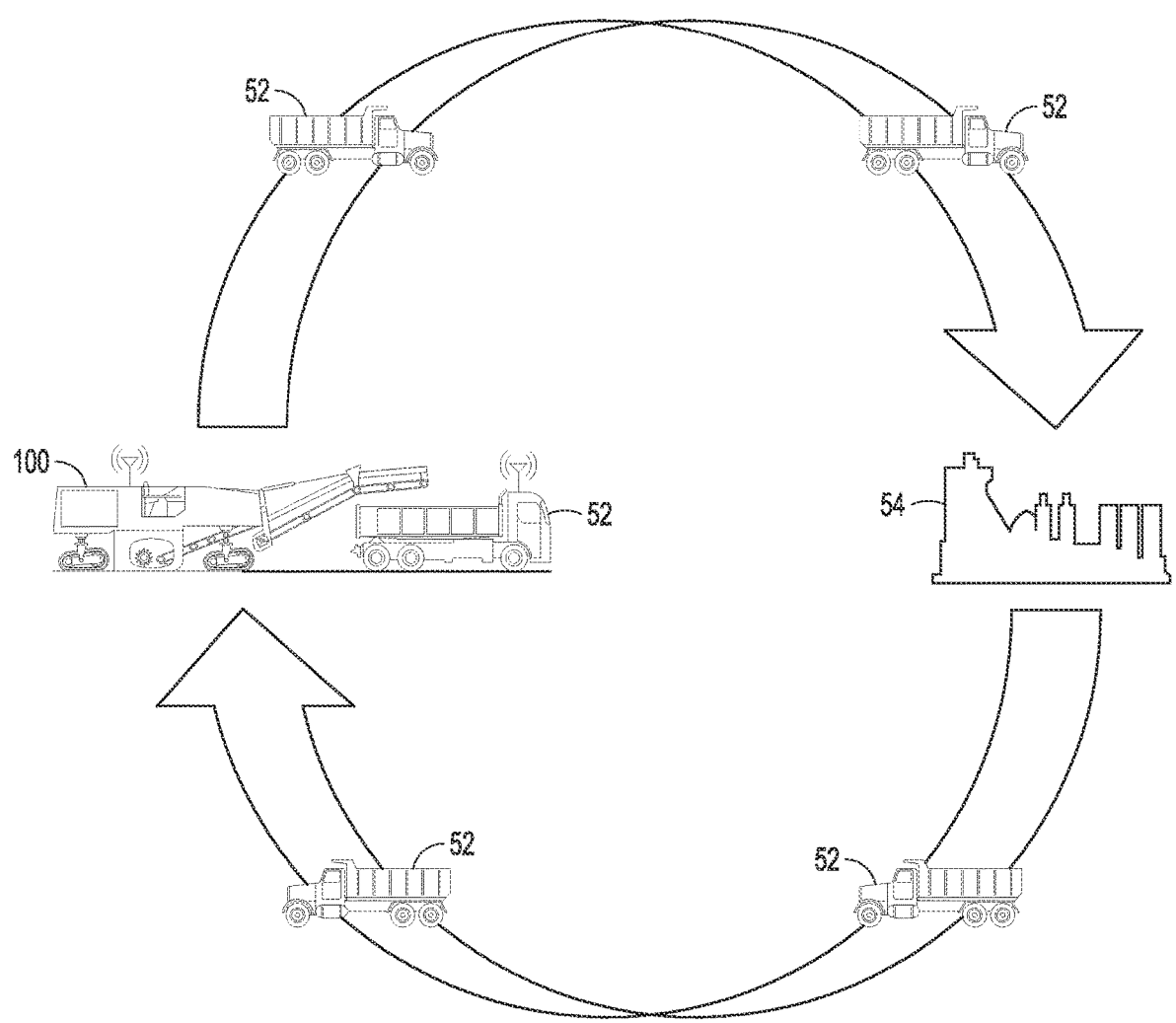
FIG. 1 is a schematic view of pavement milling project, according to one or more embodiments.

FIG. 1 is a schematic view of a pavement milling project. As shown, for example, the milling project may include a milling machine 100 such as a cold planer. The cold planer may be located at a milling project site and may operate to remove one or more layers of roadway material from a roadway surface. The cold planer may remove the material with a rotary device or milling drum that breaks up the surface creating a granular material.

Figure 2:
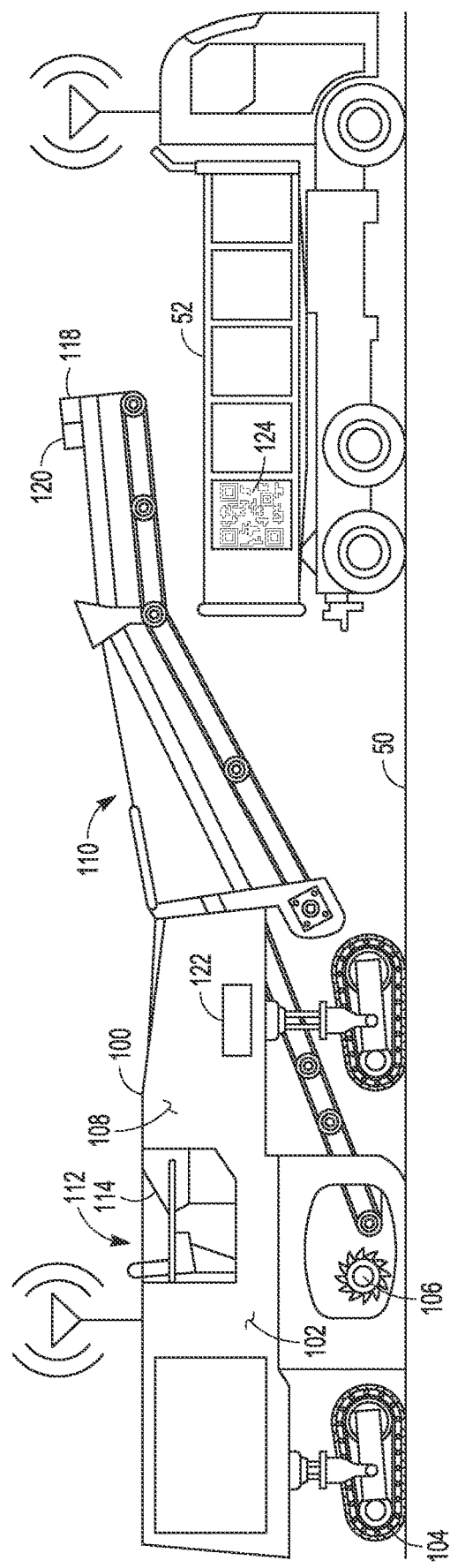
FIG. 2 is a schematic view of a pavement milling site and surrounding area, according to one or more embodiments.

As shown in FIG. 2, the cold planer may include a frame 102 supported by one or more traction devices 104, a milling drum 106 rotationally supported under a belly of frame 102, and an engine 108 mounted to frame 102 and configured to drive milling drum 106 and traction devices 104. Traction devices 104 may include either wheels or tracks connected to actuators that are adapted to controllably raise and lower frame 102 relative to a ground surface. Raising and lowering of frame 102 may also function to vary a milling depth of milling drum 106 into surface 50. In some embodiments, the same or different actuators may also be used to steer cold planer 100 and or to adjust a travel speed of traction devices 104 (e.g., to speed up or brake traction devices 104), if desired. A conveyor system 110 may be pivotally connected at a leading end to frame 102 and configured to transport material away from milling drum 106 and into a transport vehicle or truck 52.

Frame 102 may also support an operator station 112. Operator station 112 may house any number of interface devices 114 used to control cold planer 100. In the disclosed example, interface devices 114 may include, among other things, a display, a warning device, and an input device. In other embodiments, operator station 112 may be offboard cold planer 100. For example, operator station 112 may embody a remote control, such as a handheld controller, that an operator may use to control cold planer 100 from anywhere on worksite or remote from the worksite. Operator station 112 may alternatively embody a software program and user interface for a computer, and may include a combination of hardware and software. In other embodiments, cold planer 100 may be autonomous and may not include an operator station 112.

The display may be configured to render the location of cold planer 100 (e.g., of milling drum 106) relative to features of the jobsite (e.g., milled and/or unmilled parts of surface 50), and to display data and/or other information to the operator. The warning device may be configured to audibly and/or visually alert the operator of cold planer 100 as to a proximity of milling drum 106 to the worksite features, and/or when certain pieces of data exceed an associated threshold, such as when a truck being loaded is full. The input device may be configured to receive data and/or control instructions from the operator of cold planer 100. Other interface devices (e.g., control devices) may also be possible, and one or more of the interface devices described above could be combined into a single interface device, if desired.

The input device may be, for example, an analog input device that receives control instructions via one or more buttons, switches, dials, levers, etc. The input device may also or alternatively include digital components, such as one or more soft keys, touch screens, and/or visual displays. The input device may be configured to generate one or more signals indicative of various parameters associated with cold planer 100 and/or its surrounding environment based on input received from the operator.

The conveyor system 110 may include a first conveyor adjacent milling drum 106 that is configured to transfer milled material to a second conveyor. The conveyor may be pivotally attached to the frame 102 so that the height at which milled material leaves the conveyor can be adjusted. That is, a pivotal orientation of the conveyor in the vertical direction may be adjusted to raise and lower the conveyor. The conveyor may also be pivotally attached to frame 102 so that the lateral location at which milled material leaves the conveyor may be adjusted. That is, a pivotal orientation of the conveyor in the horizontal direction may be adjusted to move the conveyor from side to side.

The conveyor may include a belt that is supported on a plurality of roller assemblies and driven by a motor. The motor may embody, for example, a hydraulic motor powered by a hydraulic system (not shown). In other embodiments, the motor may be an electric motor or another type of motor. The motor may be powered by an engine or by another power source.

The conveyor may receive the milled material from the milling drum and carry the material away from the treatment area, upward to a release point where it may be released to fall into a box of a truck, for example. As shown in FIG. 1, one or more trucks 52 may be used to haul the material away from the pavement milling project. In one or more embodiments, the trucks 52 may deliver the material to an asphalt plant 54 that may reuse the material as aggregate in its asphalt manufacturing process. In other embodiments, the trucks 52 may deliver the material to a landfill or to a recycling facility. In some embodiments, multiple material delivery locations may be utilized. In one or more embodiments, the trucks 52 may return to the pavement milling site to receive and haul away additional material. The cycle of trucks 52 may continue while the milling machine 100 is in operation.

Figure 3:
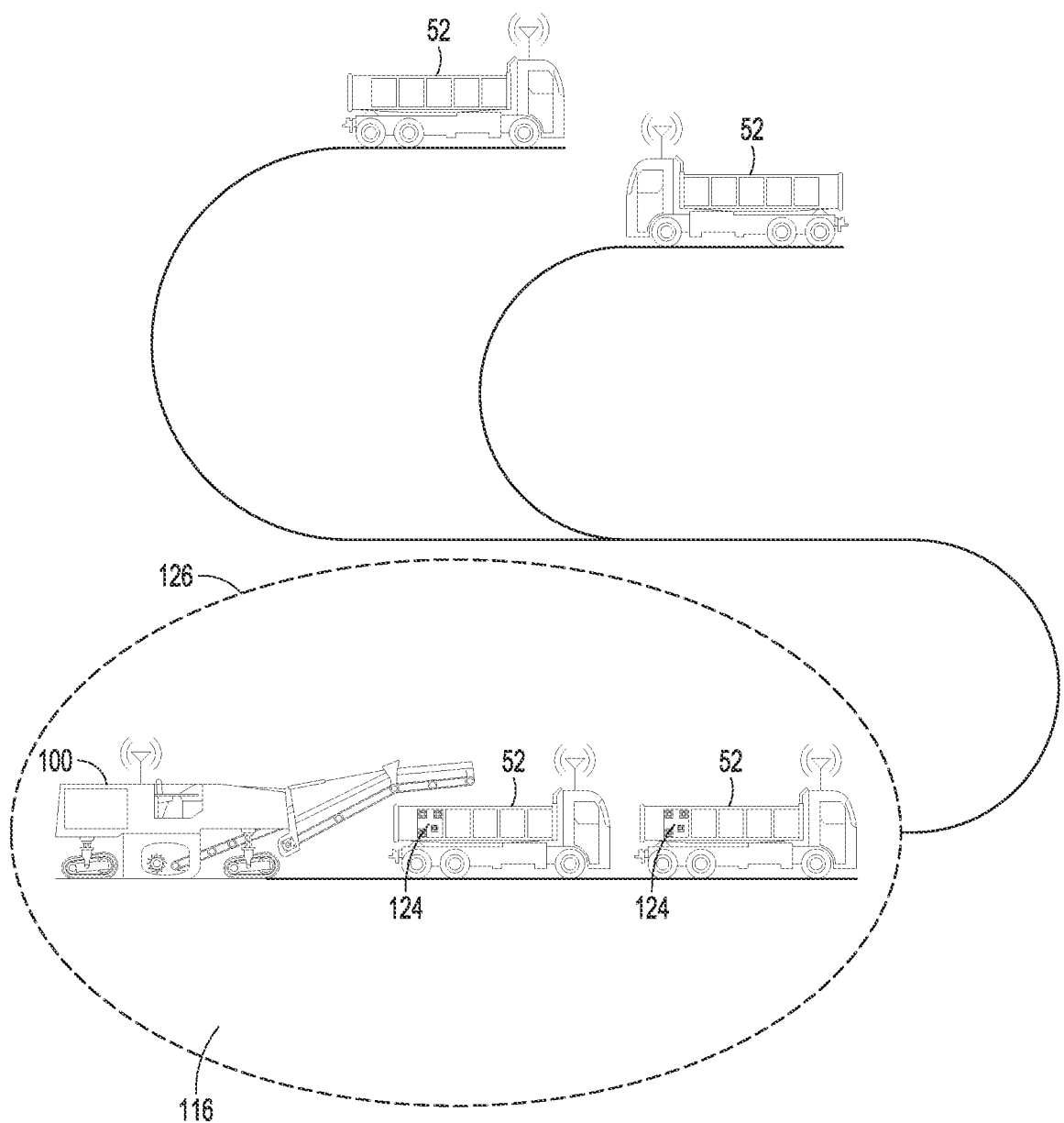
FIG. 3 is a side view of a milling machine loading a truck, according to one or more embodiments.

FIG. 3 shows a schematic view of a pavement milling site 116 such as the site shown in the overall project of FIG. 1. As shown, the milling machine 100 may be a relatively central asset on the pavement milling site 116. Trucks 52 may enter the site 116, wait as needed for a turn to receive milled material, approach the milling machine 100, receive material, and then move away from the milling machine and exit the pavement milling site 116.

In one or more embodiments, the milling machine 100 may be configured to perform an accounting of the encounters with the trucks 52 and may further be configured to assist in properly loading the trucks to a full level. The accounting may include a tally or truck count of the number of trucks and may also include the gathering of additional information about the trucks. Properly loading the trucks may include a process of establishing a truck box volume, monitoring the flow of material into the truck box, and identifying when the truck box is full. The milling machine may include an accounting and loading system for performing the above operations. The accounting and loading system may include a truck sensor 118, a loading sensor 120, and a controller 122 in communication with the truck sensor 118 and the loading sensor 120. It is to be appreciated that while an accounting and loading system have been discussed, the truck counting and loading processes may be performed by separate dedicated systems rather than one combined system.

As shown in FIG. 2, the truck sensor 118 may be provided on or near the milling machine 100 and may be configured for recognizing the presence of and/or the interaction with a truck. That is, the truck sensor 118 may be able to distinguish a dump truck from a pickup truck or from other equipment, vehicles, debris, or workers that may be present on the milling site 100. As such, the truck sensor 118 may provide reliable data regarding the number of trucks being loaded by the milling machine.

The truck sensor 118 may be positioned in one or more locations on a project site. In one or more embodiments, as shown in FIG. 2, the truck sensor 118 may be positioned at or near a top end of the conveyor 110 providing the sensor with an elevated position on the project site and giving the sensor a suitable view of approaching trucks. Moreover, this position may provide the truck sensor 118 with sight lines of the truck box allowing the truck sensor to assess the size of the truck box directly. Additionally or alternatively, the truck sensor 118 may be located off of the milling machine 100 providing the truck sensor with broader sight lines of the project site and the equipment interactions. In one or more embodiments, the truck sensor may be positioned on a tripod or on a moveable platform such that the truck sensor may move with the mill as the mill travels along a roadway. In one or more embodiments, the truck sensor may be provided on a drone providing a high level of flexibility for the position of the truck sensor. Still other mounting locations and/or systems may be provided.

In one or more embodiments, the truck sensor 118 may be a feature finding device. That is, the truck sensor may work with identifying features 124 on the trucks 52 or other systems to identify and/or recognize trucks 52. That is, for example, the trucks 52 may include QR codes on a selected surface or surfaces of the truck 52 such as painted QR code designs, decals, magnets, or otherwise applied QR codes. Alternatively or additionally, the identifying feature 124 may include an RFID tag or device. Alternatively or additionally, the identifying feature 124 may include a Bluetooth transponder and/or a Wi-Fi transponder. In these cases, the truck sensor 118 may include a corresponding sensor such as a QR Code scanner, an RFID scanner, a Bluetooth transmitter/receiver and/or a Wi-Fi transmitter/receiver. As shown in FIG. 3, the identifying feature 124 may include a GPS transponder and the truck sensor 118 may include a GPS transponder as well. A geo fence 126 may be placed around the mill 100 and trucks crossing the geo fence may be counted and identified.

Depending on the fleet of trucks being used to transport the milled material, one or more of the various types of identifying features 124 may be present on the one or more trucks 52 in the fleet. As such, multiple types of truck sensors 118 may be present on the mill 100 so as to have the flexibility to work with a variety of trucks 52 having a variety of identifying features 124.

In one or more embodiments, the truck sensor 118 may include a single-sided device. That is, instead of or in addition to being a feature finding device, the truck sensor 118 may be adapted to recognize a truck 52 or a variety of trucks 52 without any particular identifying feature on the trucks 52. The single-sided device may include a camera, 3D or 2D scanner, radar, lidar, or other device configured for recognizing the presence and/or tracking the movement of a truck 52 without any particular feature or device on the truck itself. The single-sided device may be supported by computer software adapted to analyze data, such as image data or point cloud data, received from the device and assess whether a truck 52 is present. In one or more embodiments, the computer software may include a series of metrics generally defining the size and shape of a truck, such as a dump truck, allowing the system to recognize the presence of the truck, for example. In one or more embodiments, more detailed metrics may be used to recognize the particular type of truck that is present and/or to assess the size of the truck.

In any of the above cases, the truck sensor 118 may continually or periodically scan the project site and/or the area approaching the mill 100 for trucks 52. The truck sensor 118 may be in wired or wireless communication with the controller and the truck sensor 118 may transmit the truck information to the controller for processing. It is to be appreciated that the identifying features on the trucks may allow for capturing information about the respective trucks in addition to recognizing their presence or interaction with the mill. That is, for example, a QR code, an RFID device, a Bluetooth transponder, Wi-Fi transponder, or a GPS transponder, may contain make and model information about the truck, truck box size, load carrying capacity, axle counts, axle loads, target load, or other information about the truck. The truck sensor 118 may transmit this information to the controller as well.

The loading sensor 120 may be configured to monitor loading of the trucks 52 by the mill and may allow the controller 122 to identify the status of truck loading. (e.g., empty, particular fullness levels, full, weighted side to side, etc.). Depending on the nature of the truck sensor 118, the loading sensor 120 may be part and parcel to the truck sensor 118. That is, where the truck sensor 118 has capabilities that allow for counting trucks and monitoring loading of the trucks, the truck sensor 118 and the loading sensor 120 may be a single sensor allowing for the performance of both functions.

Figure 4:
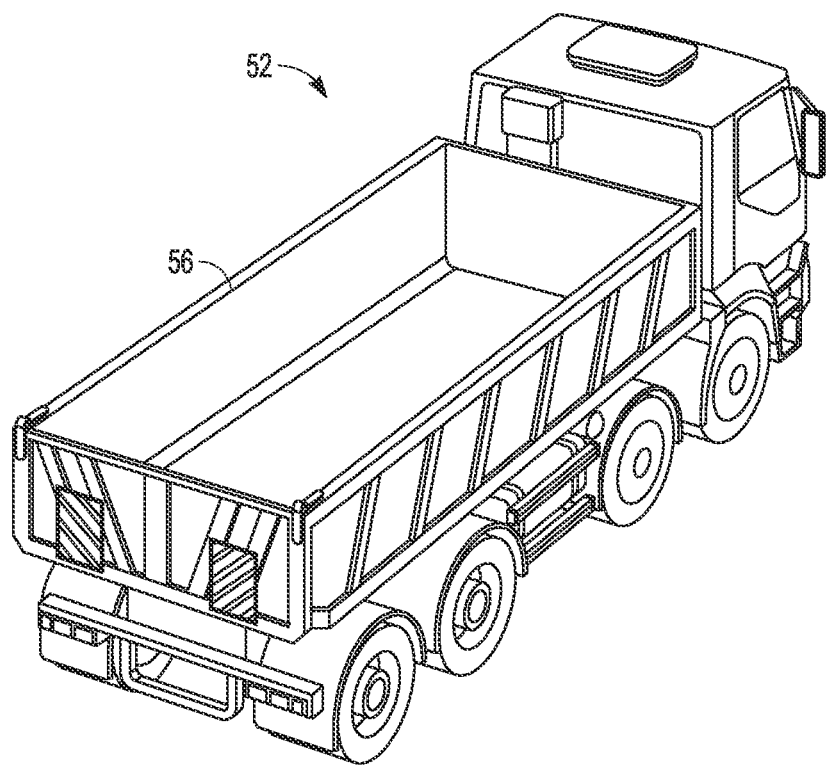
FIG. 4 is a rear perspective view of an empty dump truck, according to one or more embodiments.
Figure 5:
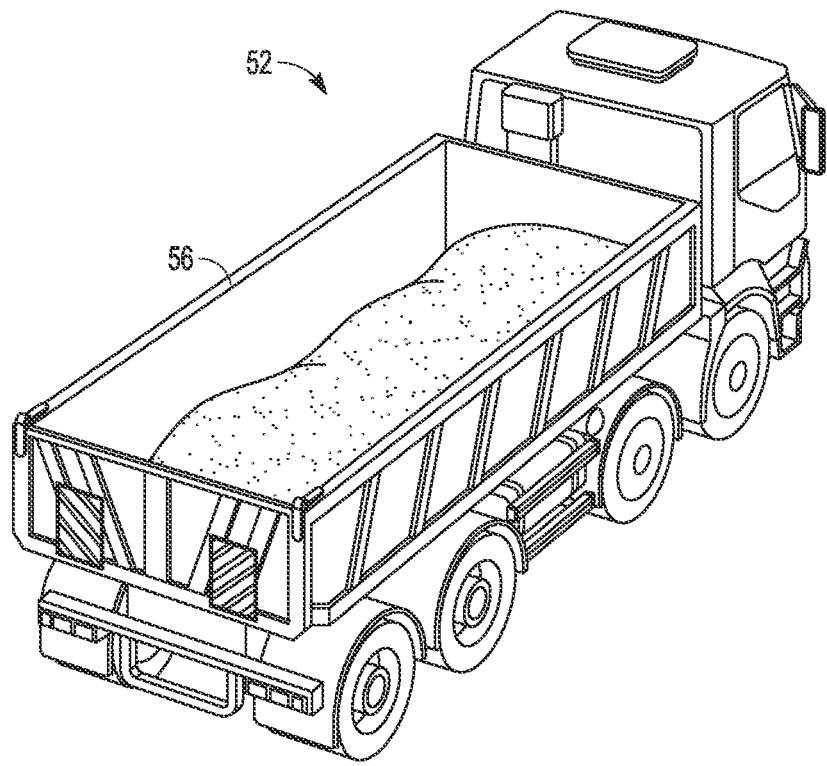
FIG. 5 is a rear perspective view of a partially filled dump truck, according to one or more embodiments.
Figure 6:
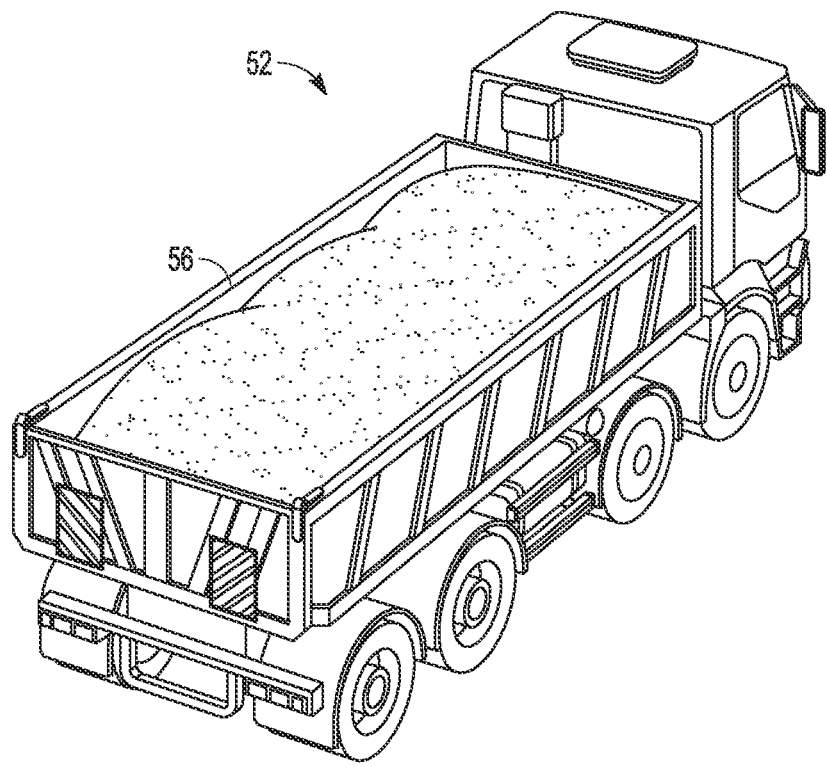
FIG. 6 is a rear perspective view of a full dump truck, according to one or more embodiments.
Figure 7:
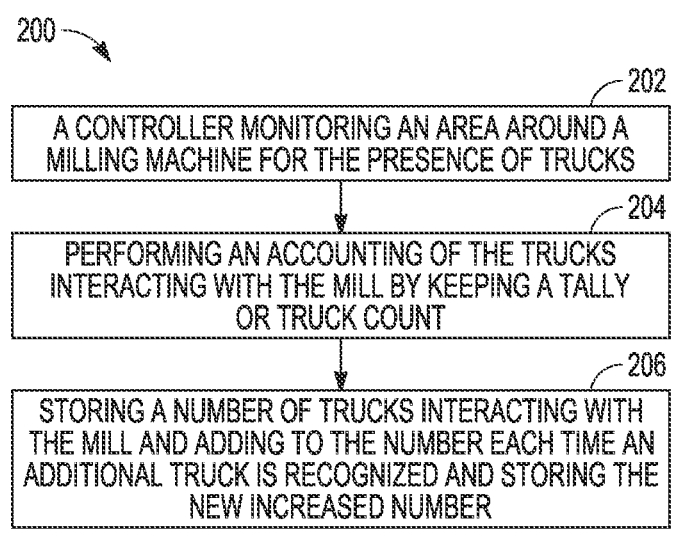
FIG. 7 is a method diagram showing a method of accounting, according to one or more embodiments.
Figure 8:
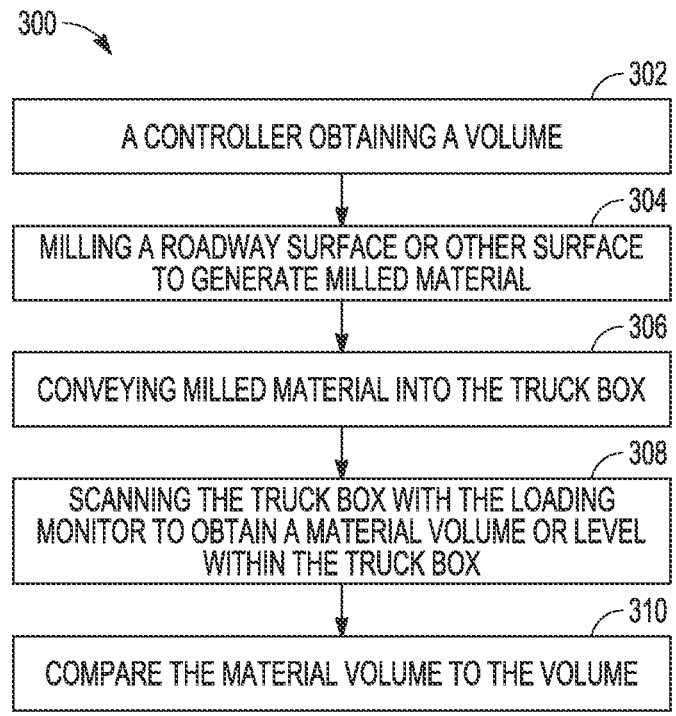
FIG. 8 is a method diagram showing a method of load monitoring, according to one or more embodiments.
Figure 9:
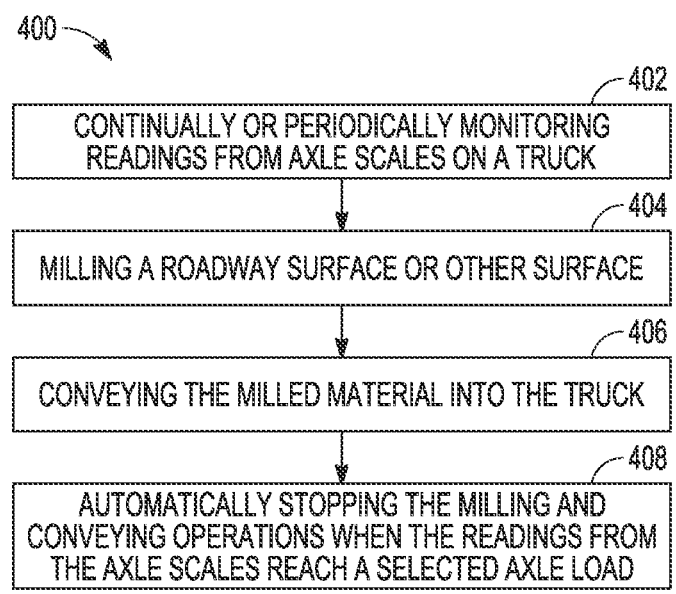
FIG. 9 is a method diagram showing a method of load monitoring, according to one or more embodiments.

In one or more embodiments, the loading sensor 120 may include a 3D scanner or a smart camera. The loading sensor 120 may be arranged at or near the top end of the conveyor 110 on the mill 100 providing the loading sensor 120 with a top down view of truck boxes 56 as trucks back under the conveyor 110. The loading sensor 120 may scan the truck box 56 to establish an available volume and may monitor the filling of the truck box 56 continually or periodically. That is, as shown in FIGS. 4-6, the loading sensor 120 may capture images of the truck box 56 and may transmit the images to the controller allowing for the volume of the material in the truck box to be determined. This information may be used to automatically start loading (e.g., when the truck is present and empty), to monitor the loading progress, and to automatically stop the loading when the truck is full, for example. With density information about the roadway material being milled, the controller may further determine the weight of the material in the truck box. Where truck capacity information is available via the truck sensor information, the controller may, thus, determine when a particular truck is loaded to capacity and automatically stop the loading of the truck. It is to be appreciated that the loading sensor 120 may be arranged at other locations as well and, for example, may be arranged on a drone in wired or wireless communication with the mill 100.

In still other embodiments, the truck 52 may include the loading sensor 120. That is, for example, the truck may include a 3D scanner or smart camera arranged on the top of the cab of the truck. The scanner or camera may be rearward facing and may be in wireless communication with the controller 122 on the mill 100. In still other embodiments, the loading sensor 120 may be a sensor or system that is in communication with axle scales on the truck 52. That is, where the truck being loaded is equipped with axle scales, the loading sensor 120 may be in Bluetooth, Wi-Fi. or other wireless communication with the axle scales and may transmit this information to the controller 122. In still other embodiments, the axle scales may be the loading sensor 120 and the scales may be in wireless communication with the controller 122. In either of these cases, the controller 122 may, thus, load the truck until the axle scales reach a maximum load limit and then the controller 122 may automatically stop the loading of the truck 52.

The controller 122 may work with the truck sensor 118 and/or the loading sensor 120 to perform accounting operations and to monitor and/or control truck loading. In one or more embodiments, the controller 122 may include computer-implemented instructions stored in a memory of a computing device. The computer-implemented instructions, when executed, may perform one or more methods such as a method of accounting and/or a method of load monitoring. In one or more embodiments, the computing device may be a dedicated computing device or the computing device may be the computing device normally present on the mill for controlling and operating the mill.

INDUSTRIAL APPLICABILITY

In operation and use, the accounting and loading system may perform one or more methods. In one or more embodiments, the system may perform a method of accounting. (200) The method may include a controller monitoring an area around a milling machine for the presence of trucks. (202) The monitoring may include coordinating with a truck sensor to recognize the presence of a truck. In one or more embodiments, recognizing the presence of a truck may include using the controller to analyze image data or point cloud data generated by the truck sensor to determine that a truck is present. In one or more other embodiments, recognizing the presence of a truck may include recognizing an identifying feature on the truck such as a QR Code, RFID, Bluetooth transponder, Wi-Fi transponder, or GPS transponder. In still further embodiments, recognizing the presence of a truck may include receiving information about a truck crossing a geo fence. Instill further embodiments, recognizing the presence of a truck may include scanning a truck box volume. That is, where a 3D scanner or smart camera is provided as the loading sensor, the scanning of the truck box may indicate that a truck is present and interacting with the mill. The method may include performing an accounting of the trucks interacting with the mill by keeping a tally or truck count, for example. (204) Keeping a tally or truck count may include storing a number of trucks interacting with the mill and adding to the number each time an additional truck is recognized and storing the new increased number. (206) The method may be performed over a range of time frames that may run simultaneously. For example, the method may be performed over a day, over the time of operation at a particular site, during a work shift, over the lifetime of the mill, and/or over a specific period selectable by the operator. The method may also include transmitting the tally to the back office for use in estimating, bidding, and/or billing future projects.

The system may also perform a method of load monitoring. (300) The method may include a controller obtaining a truck box volume. (302) The obtaining may include coordinating with a loading monitor and scanning the truck box. The scanning may be performed with a 3D scanner or smart camera, for example. In one or more embodiments, the truck box volume may be obtained from a QR Code, RFID, or other data containing feature on the truck. In one or more embodiments, the load monitor may determine a number of axles on a truck and the controller may calculate a load estimate based on known allowable axle loads, for example. The load estimate may be used to calculate a volume estimate based on the density of the milled material. The method may include storing the truck box volume or the volume estimate, displaying the truck box volume or the volume estimate for the mill operator, and/or transmitting the truck box volume or the volume estimate to the truck or central office.

The method may also include milling a roadway surface or other surface to generate milled material (304) and conveying milled material into the truck box (306). The method may also include continually or periodically rescanning the truck box with the loading monitor to obtain a material volume or level within the truck box. (308) The method may also include adjusting the position of the conveyor based on images or data from the loading monitor to more evenly load the truck box. The controller may compute the material volume and compare the material volume to the truck box volume or the volume estimate (310) and/or the controller may display the material volume such that the operator may compare the material volume to the truck box volume or the volume estimate. The method may also include automatically starting the milling and conveying operation when a truck is present and empty (or not full such as when a partially full truck arrives). The method may also include automatically stopping the milling and conveying operation when the material volume is the same as the truck box volume or some selected percentage of the truck box volume. Alternatively or additionally, the method may include actuating an alert when the material volume approaches the truck box volume and the operator may stop the milling and conveying operation.

In one or more embodiments, the method may also include converting the material volume to a material weight based on a known density of the milled material. In one or more embodiments, the material weight may be compared to known weight or loading limits for the truck. In still other embodiments, the material weight may be compared to a plurality of axle load limits or other types of load limits. The method may also include storing the volume and/or weight loaded onto the truck and/or storing the amount of time used to load the truck. The method may also include accumulating the total volume and/or weight of material loaded onto a plurality of trucks throughout a work shift, a day, a week, a project, or another timeframe. The method may also include transmitting the individual truck volumes/weights, the total volumes/weights, and/or the truck loading times to a central office for use in estimating, bidding, and/or billing future projects.

In one or more embodiments a method of load monitoring (400) may include continually or periodically monitoring readings from axle scales on a truck (402). The method may include milling a roadway surface or other surface (404) and conveying the milled material into the truck (406). The method may also include automatically stopping the milling and conveying operations when the readings from the axle scales reach a selected axle load. (408) The method may also include calculating a total weight of milled material loaded onto a truck based on the axle scales and the number of axles and the axle geometry, for example. The method may also include calculating a volume of milled material loaded onto the truck based on the density of the material being milled. The method may also include accumulating the total volume and/or weight of material loaded onto a plurality of trucks throughout a work shift, a day, a week, a project, or another timeframe. The method may also include transmitting the individual truck volumes/weights and/or the total volumes/weights to a central office for use in estimating, bidding, and/or billing future projects.

The above detailed description is intended to be illustrative, and not restrictive. The scope of the disclosure should, therefore, be determined with references to the appended claims, along with the full scope of equivalents to which such claims are entitled.

What is claimed is:

1. A milling machine, comprising:
    a frame supported by a traction device;
    a milling drum for milling a surface and supported on the frame;
    a conveyor for receiving milled material from the milling drum and conveying the milled material upward to a release point;
    a sensor comprising a scanner configured for monitoring loading of a truck by the milling machine; and
    a controller in communication with the scanner and being configured to:
        control the scanner to scan a box of the truck;
        calculate an empty available volume of the box based on a geometry determined by the scan;
        control the scanner to periodically scan the box of the truck to monitor an amount of milled material in the box;
        periodically or continually compare the amount of milled material to the empty available volume to establish when the box is full;
        store the amount of milled material associated with the box being full; and
        accumulating a total amount of milled material loaded onto a plurality of trucks over a selected timeframe.

2. The milling machine of claim 1, wherein the sensor comprises a feature finding device.

3. The milling machine of claim 2, wherein the feature finding device comprises a QR code scanner.

4. The milling machine of claim 2, wherein the feature finding device comprises an RFID scanner.

5. The milling machine of claim 2, wherein the controller is further configured to obtain a truck box volume from a feature captured by the feature finding device.

6. The milling machine of claim 5, wherein the controller is configured to manage loading of the truck based on the truck box volume.

7. The milling machine of claim 2, wherein the controller is further configured to determine a number of axles on the truck from a feature captured by the feature finding device.

8. The milling machine of claim 7, wherein the controller is further configured to calculate a load estimate based on known allowable axle loads.

9. The milling machine of claim 1, wherein the controller is further configured to transmit the total amount of milled material to a back office.

10. The milling machine of claim 1, wherein the controller is further configured to transmit a tally of the plurality of trucks to a back office.

11. The milling machine of claim 1, wherein the selected timeframe is a workday.

12. The milling machine of claim 1, wherein the selected timeframe is a time of operation at a particular site.

* * * * *